United States Patent
Dai et al.

[11] Patent Number: 6,006,157
[45] Date of Patent: Dec. 21, 1999

[54] REAL-TIME ENGINE MISFIRE DETECTION METHOD

[75] Inventors: Wengang Dai, Canton; Rodney John Tabaczynski, Saltine; Nizar Trigui, Ann Arbor, all of Mich.

[73] Assignee: Ford Global Technologies, Inc., Dearborn, Mich.

[21] Appl. No.: 09/303,931

[22] Filed: May 3, 1999

[51] Int. Cl.[6] .................................................. G06F 19/00
[52] U.S. Cl. ........................ 701/114; 701/110; 701/111
[58] Field of Search .................................. 701/114, 110, 701/111

[56] References Cited

U.S. PATENT DOCUMENTS

| | | | |
|---|---|---|---|
| 5,337,240 | 8/1994 | Nakagawa et al. | 701/99 |
| 5,576,963 | 11/1996 | Ribbens et al. | 701/111 |
| 5,893,042 | 4/1999 | Lohmann et al. | 701/111 |

OTHER PUBLICATIONS

Regimes of Premixed Turbulent Combustion and Misfire Modeling in SI Engines—Authored by Wen Dai, Stephen G. Russ, Nizar Trigui and Kevin Tallio.

Society of Automotive Engineers, Inc. publication of Oct. 19, 1998, paper No. 982611.

*Primary Examiner*—Willis R. Wolfe
*Assistant Examiner*—Hieu T. Vo
*Attorney, Agent, or Firm*—Jerome R. Drouillard; Allan J. Lippa

[57] ABSTRACT

A method of detecting internal combustion engine misfires by generating a predicted Karlovitz number as a function of different engine operating conditions such as the air fuel ratio (AFR), the engine speed, the amount of exhaust gas recirculation (EGR), spark-ignition (SI) timing and the airflow rate. The predicted Karlovitz number is then compared against the threshold Karlovitz number in which misfire occurs. The threshold Karlovitz number is determined from a model for misfire predictions in engines and is stored in the electronic engine controller (EEC). A misfire is reported if the predicted Karlovitz number is greater than the threshold Karlovitz number. In another aspect of the invention, the predicted Karlovitz number is generated from submodels of laminar flame speed, laminar flame thickness, turbulence intensity, and turbulence integral length scale.

14 Claims, 1 Drawing Sheet

REAL-TIME ENGINE MISFIRE DETECTION METHOD

BACKGROUND

The present invention relates generally to internal combustion engines and, more particularly, to an automobile engine misfire detection system and method based on mathematical models for spark-ignited engines and misfire prediction.

Engine misfire can occur for several reasons such as the absence of spark in the cylinder, poor fuel metering, inadequate compression, or other similar conditions. As a result of engine misfires, an increased amount of unburned combustion byproducts are passed through the catalytic converter. Over time, engine misfiring can cause damage to the catalyst in the catalytic converter and, consequently, increase the amount of combustion byproducts emitted into the atmosphere.

Because engine misfire can effect engine emissions, government regulatory agencies require that the vehicle fuel control system detect and indicate emission malfunctions such as misfiring. This engine misfiring information is typically collected and stored in computer memory associated with the vehicle engine for later downloading and analysis at a service center.

A variety of schemes have been developed for misfire detection including: (1) ionization current monitoring, (2) combustion pressure detection—which requires a pressure transducer in every engine cylinder, (3) cylinder pressure reconstruction using crankshaft speed variation, and (4) measurement of crankshaft angular velocity as well as other techniques based on crankshaft angular velocity and/or acceleration. There are several drawbacks to these present misfire detection methods. The first two methods require additional sensors or hardware which increase the system cost and complexity. In addition, the misfire detection methods based on crankshaft velocity or acceleration are prone to detection errors because they are based on four major assumptions: (1) a constant co-efficient driveline model, (2) a constant load torque, (3) a torsionally rigid crankshaft, and (4) non-overlapping firing pulses. These assumptions can result in a normal combustion cycle being counted as a misfire, and a misfired combustion cycle going undetected.

SUMMARY OF THE INVENTION

An object of the invention is to provide an improved method of detecting engine misfires.

Another object is to accurately detect engine misfires using sensors commonly found in engine control systems.

According to the present invention, the foregoing and other object and advantages are attained by a method of detecting internal combustion engine misfires by generating a predicted Karlovitz number as a function of different engine operating conditions such as the air fuel ratio (AFR), the engine speed, the amount of exhaust gas recirculation (EGR), the spark-ignition (SI) timing, and the air flow rate. The predicted Karlovitz number is then compared against the threshold Karlovitz number at which misfire occurs. The threshold Karlovitz number is determined from a model for misfire predictions in engines and is stored in the electronic engine controller (EEC). A misfire is reported if the predicted Karlovitz number is greater than the threshold Karlovitz number.

In another aspect of the invention, the predicted Karlovitz number is generated from submodels of laminar flame speed, laminar flame thickness, turbulence intensity, and turbulence integral length scale.

Other objects and advantages of the invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DESCRIPTION OF THE PREFERRED EMBODIMENT

In a conventional spark-ignited engine, the fuel and air are mixed together in the intake system, inducted through the intake valve into the engine cylinders, mixed with residual gas, and then compressed. Under normal operating conditions, combustion is initiated toward the end of the compression stroke by the spark plug. Following the flame kernel formation, a flame develops, propagates through this essentially pre-mixed fuel/air and residual burned gas mixture until it reaches the combustion chamber walls, and is extinguished.

Like most processes in engines, misfire is a very complicated phenomena. Attempts to simulate misfire can easily result in extremely complex, yet inefficient, models. Misfire typically occurs in a spark-ignition engine when the spark fails to ignite the mixture, or the combustion stops and the flame quenches in the kernel stage. Partial misfire occurs when the flame quenches after being fully developed, or flame growth becomes so slow that combustion takes place in a small fraction of the mixture and is incomplete when the exhaust valve opens. To date, no flame kernel model has been developed with the capability of simulating misfire and misfire limits.

Although no satisfactory flame kernel model has been developed, the characteristics of pre-mixed turbulent combustion have been modeled based on empirical data. Specifically, researchers from the University of Leeds analyzed experimental data taken in a combustion bomb and defined boundaries for each pre-mixed turbulent combustion regime. The Leeds diagram is the basis for the present misfire engine model and is shown in FIG. 1.

Figure 1:
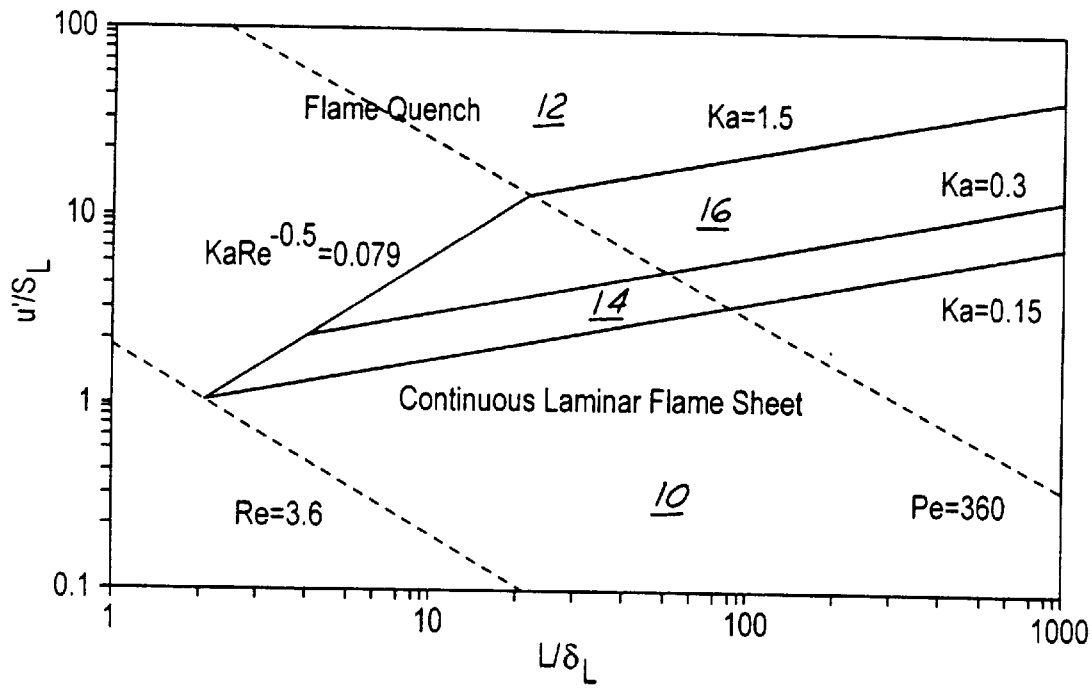
FIG. 1 is a Leeds diagram representing an engine misfire model.

Referring to FIG. 1, the boundaries associated with pre-mixed turbulent combustion are represented by the continuous laminar flame sheet region 10, the flame quench region 12, region 14 defining the breakup of the continuous laminar flame sheet, and the fragmented reaction zone 16 where flame quenching begins to develop. In FIG. 1, a misfire occurs where the Karlovitz number (Ka) is greater than or equal to 1.5 if the turbulent Reynolds number (Re) is greater than or equal to 360. Sub-models define the parameters of the Leeds Diagram in FIG. 1. These include the turbulence intensity (u'), turbulent integral length scale (L), laminar flame speed ($S_L$) laminar flame thickness ($\delta_L$) and Karlovitz number (Ka). Thus, as shown in FIG. 1, the threshold Karlovitz value is 1.5.

The misfire detection method of the present invention generates a predicted Karlovitz number ($Ka_p$) from engine operating parameters in real-time and compares this value to the threshold Karlovitz number ($Ka_t$). A misfire is indicated if $Ka_p$ exceeds $Ka_t$. Through experimentation, it has been determined that certain engine operating parameters are related to misfire detection. These include EGR rates, air fuel ratio, engine speed, spark timing and air flow rate. The relationship between these engine operating parameters and their effect on combustion is described in SAE paper number 982611 entitled "Regimes of Pre-Mixed Turbulent Combustion and Misfire Modeling in SI Engines" which is herein incorporated by reference. As discussed in the referenced paper, different engines shared the same regimes of turbulent combustion. This normally takes place in the continuous laminar flame sheet region 10, breakup region 14, and fragmented reaction zone 16.

Figure 2:
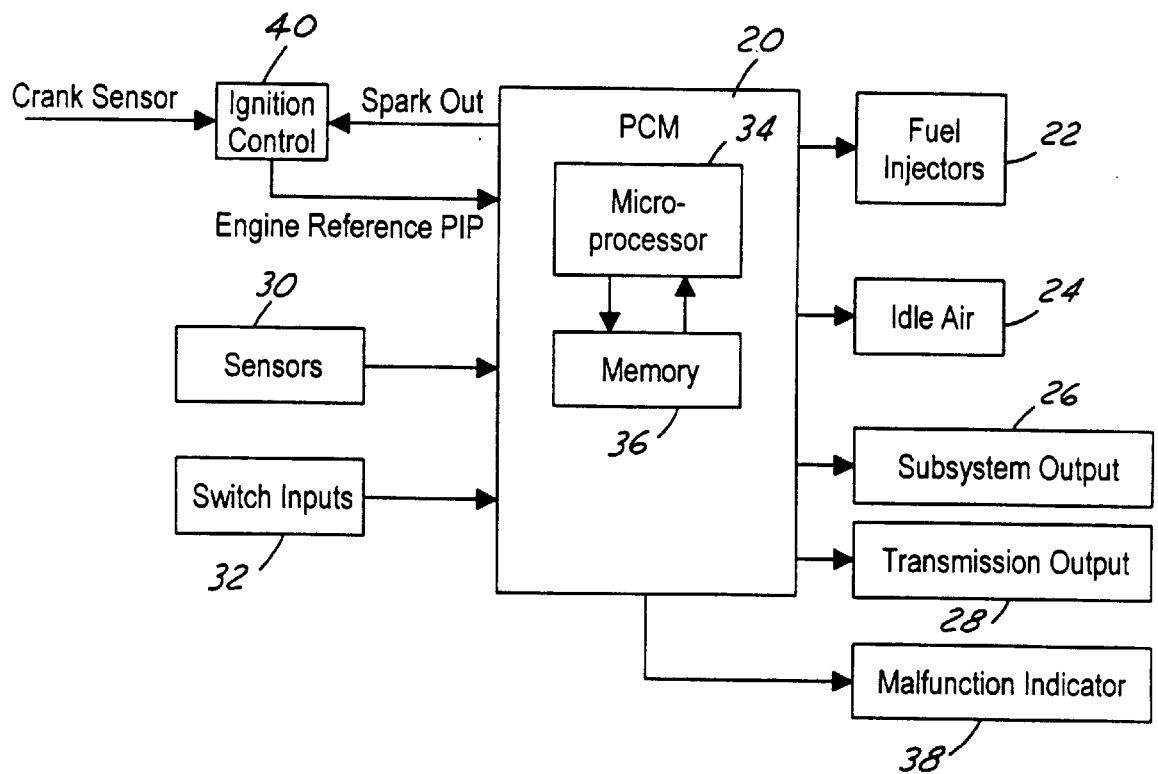
FIG. 2 is a schematic diagram of an engine control and misfire detection system according to one embodiment of the present invention.

FIG. 2 shows a schematic diagram of one embodiment of the present misfire detection scheme based on the Leeds Diagram of FIG. 1. As shown in FIG. 2, powertrain control module (PCM) 20 controls the engine operation by regulating the fuel supply, spark timing, and air flowing to the engine. Fuel is metered by injectors 22 and spark timing is regulated by ignition control module 40 in response to spark-out signal from PCM 20. Airflow is represented by idle air block 24. The engine operation is further controlled by the PCM via the subsystem output module 26 which represents, for example, the EGR control valve.

PCM 20 is also responsible for regulating transmission output 28 by, for instance, controlling the shift solenoid. PCM 20 receives as inputs the engine reference PIP, sensor input 30 and switch inputs 32. Sensors 30 represents the cam profile, mass airflow sensor (MAF), manifold absolute pressure sensor (MAP), fuel flow and EGR flow, for example. Switch inputs 32 represent such things as the air conditioning and parking brake.

PCM 20 includes a microprocessor 34 an associated memory 36. Memory 36 stores the misfire model of FIG. 1 which provides the threshold Karlovitz value ($Ka_t$). Microprocessor 34 is designed to generate, in real-time, the predicted Karlovitz number based upon sensor inputs 30. When $Ka_p$ exceeds the $Ka_t$, the misfire information is collected and stored in memory 36. Furthermore, if the percentage of misfires out of the total number of firing events exceeds regulatory minimum, the malfunction indicator 38 is activated to signal to the operator that the engine system should be tested. The misfire data collected in memory 36 can then be downloaded at the vehicle service center during diagnostic testing.

The generation of $Ka_p$ will now be described. $Ka_p$ is defined as follows:

$$Ka_p = 0.157(u'/S_L)^2 R_e^{-0.5} \quad (1)$$

wherein the turbulent Reynolds number is defined as:

$$R_e = u'L/V \quad (2)$$

wherein u' represents the turbulent intensity, $S_L$ represents the laminar flame speed, L represents the turbulence integral length scale, and V represents the kinematic viscosity.

The laminar flame speed is a function of the residual gas fraction ($R_f$) and is defined as:

$$S_L(R_f) = S_{L,\circ}(T/T_o)\alpha(P_o/P)\beta(1 - 4.1R_F + 4.7R_F^2) \quad (3)$$

wherein T is temperature, $T_o$ is standard temperature, P is pressure, and $P_o$ is standard pressure.

In equation (3), alpha and beta represent functions of the air/fuel ratio.

In addition, the laminar flame thickness is defined as:

$$\delta_L = V/S_L \quad (4).$$

The turbulent intensity can be derived from a turbulence model defined as:

$$dk/dt = P^k_{dens} + P_{sq} + P_{sh} + F^k_{int} + P_{turb} - P\epsilon \quad (5)$$

wherein the turbulence dissipation is defined as:

$$= \epsilon(C\, k^{3/2})/L \quad (6)$$

Thus, the turbulent intensity is defined by:

$$u' = (3k/2)^{1/2} \quad (7)$$

and the integral length scale is represented by:

$$L = L_o(k_o/k)^{1/2} \quad (8)$$

Alternatively, the turbulent intensity and integral length scales can be defined as:

$$u' = 0.25 U_{piston} \quad (9)$$

$$L = 0.33 H_{clearance} \quad (10)$$

Wherein $U_{piston}$ is the piston mean speed and $H_{clearance}$ represents the piston clearance at Top Dead Center.

In operation $S_L$, $\delta_L$, u', and L are derived from the sensor inputs to the PCM 20. Specifically, AFR, EGR flow, SI timing, and engine RPM are sensed or derived from sensor inputs such as MAF, MAP and fuel flow. Once $Ka_p$ is determined, it is compared to $Ka_t$ which, in this case, is equal to 1.5. If $Ka_p$ exceeds $Ka_t$, then a misfire event is indicated and stored in memory 36.

Alternatively, rather than calculating $Ka_p$ in real-time for each combustion cycle, a lookup table of $Ka_p$ values can be generated and stored for each unique set of engine operating parameters. In such an embodiment, PCM memory 36 must be sufficiently large to store all the possible values of $Ka_p$ for each unique set of engine operating parameters. The benefit, however, would be that a microprocessor having reduced computational speed could be used in place of the microprocessor required to operate the misfire detection in real-time.

From the foregoing, it will be seen that there has been brought to the art a new and improved misfire detection method which overcomes the drawbacks of prior misfire detection schemes. While the invention has been described in connection with one or more embodiments, it will be understood that the invention is not limited to those embodiments. On the contrary, the invention covers alternatives, modifications and equivalents as may be included within the spirit and scope of the appended claims.

What is claimed is:

1. A powertrain control module for controlling the operation of an internal combustion engine comprising memory and a microprocessor programmed to:

receive as inputs a plurality of engine operating parameters;

generate a predicted Karlovitz number ($Ka_p$) as a function of said plurality of engine operating parameters;

compare $Ka_p$ to a threshold Karlovitz number ($Ka_t$) representing the value at which misfire occurs; and indicate an engine misfire event if $Ka_p > Ka_t$.

2. The powertrain control module of claim 1 wherein said microprocessor generates a predicted Karlovitz number ($Ka_p$) as a function of said plurality of engine operating parameters by:

determining an AFR value indicative of the air/fuel ratio of the in-cylinder mixture of the engine;

determining an RPM value indicative of the engine speed;

determining an EGR value indicative of the amount of exhaust gas recirculation in the engine;

determining an SI value indicative of the spark-ignition ignition timing of the engine;

determining an airflow value indicative of the engine intake airflow; and generating $Ka_p$ as a function of said AFR, RPM, EGR, SI and airflow values.

3. The powertrain control module of claim 1 wherein the microprocessor is programmed to generate a predicted Karlovitz number ($Ka_p$) as a function of said plurality of engine operating parameters by calculating $Ka_p$ for each combustion cycle in real-time.

4. The powertrain control module of claim 1 wherein the microprocessor is programmed to generate a predicted Karlovitz number ($Ka_p$) as a function of said plurality of engine operating parameters by retrieving $Ka_p$ from a table of values indexed by said engine operating parameters for each combustion cycle.

5. A method of detecting misfire of an internal combustion engine comprising the steps of:

determining a plurality of engine operating parameters;

generating a predicted Karlovitz number ($Ka_p$) as a function of said plurality of engine operating parameters;

comparing $Ka_p$ to a threshold Karlovitz number ($Ka_t$) representing the value at which misfire occurs; and indicating an engine misfire event if $Ka_p > Ka_t$.

6. The method as set forth in claim 5 wherein the step of determining a plurality of engine operating parameters includes the steps of:

determining an AFR value indicative of the air/fuel ratio of the in-cylinder mixture of the engine;

determining an RPM value indicative of the engine speed;

determining an EGR value indicative of the amount of exhaust gas recirculation in the engine;

determining an SI value indicative of the spark-ignition timing of the engine; and determining an airflow value indicative of the engine intake airflow.

7. The method as set forth in claim 6 wherein the step of generating a predicted Karlovitz number ($Ka_p$) includes the steps of:

generating a laminar flame speed value ($S_L$), a laminar flame thickness value ($\delta_L$), a turbulent intensity value (u'), and turbulence integral length scale value (L) as a function of said AFR, RPM, EGR, SI and airflow values; and generating $Ka_p$ as a function of $S_l$, $\delta_L$, u', and L.

8. The method as set forth in claim 5 wherein the step of generating a predicted Karlovitz number ($Ka_p$) as a function of said plurality of engine operating parameters includes calculating $Ka_p$ for each combustion cycle in real-time.

9. The method as set forth in claim 5 wherein the step of generating a predicted Karlovitz number ($Ka_p$) as a function of said plurality of engine operating parameters includes retrieving $Ka_p$ from a table of values indexed by said engine operating parameters for each combustion cycle.

10. In an internal combustion engine system controlled by a powertrain control module which receives as inputs a plurality of engine operating parameters and outputs a spark ignition (SI) control value, said powertrain control module including a microprocessor and associated memory, a method of detecting misfires of said engine comprising the steps of:

generating a predicted Karlovitz number ($Ka_p$) as a function of said plurality of engine operating parameters;

comparing $Ka_p$ to a threshold Karlovitz number ($Ka_t$) representing the value at which misfire occurs; and indicating an engine misfire event if $Ka_p > Ka_t$.

11. The method as set forth in claim 10 wherein the step of generating a predicted Karlovitz number ($Ka_p$) includes the steps of:

generating a laminar flame speed value ($S_L$), a laminar flame thickness value ($\delta_L$), a turbulent intensity value (u'), and turbulence integral length scale value (L) as a function of said SI value and said plurality of engine operating parameters; and generating $Ka_p$ as a function of $S_L$, $\delta_L$, u', and L.

12. The method as set forth in claim 10 wherein the step of generating a predicted Karlovitz number ($Ka_p$) includes the steps of:

determining an AFR value indicative of the air/fuel ratio of the in-cylinder mixture of the engine;

determining an RPM value indicative of the engine speed;

determining an EGR value indicative of the amount of exhaust gas recirculation in the engine;

determining an airflow value indicative of the engine intake airflow;

generating a laminar flame speed value ($S_L$), a laminar flame thickness value ($\delta_L$) a turbulent intensity value (u'), and turbulence integral length scale value (L) as a function of said SI value and said AFR, RPM, EGR and airflow values; and generating $Ka_p$ as a function of $S_L$, $\delta_L$, u', and L.

13. The method as set forth in claim 10 wherein the step of generating a predicted Karlovitz number ($Ka_p$) as a function of said plurality of engine operating parameters includes calculating $Ka_p$ for each combustion cycle in real-time.

14. The method as set forth in claim 10 wherein the step of generating a predicted Karlovitz number ($Ka_p$) as a function of said plurality of engine operating parameters includes retrieving $Ka_p$ from a table of values indexed by said engine operating parameters for each combustion cycle.

* * * * *